B. G. LAMME.
ELECTRICAL LOAD EQUALIZING SYSTEM.
APPLICATION FILED NOV. 6, 1908.
925,356.
Patented June 15, 1909.
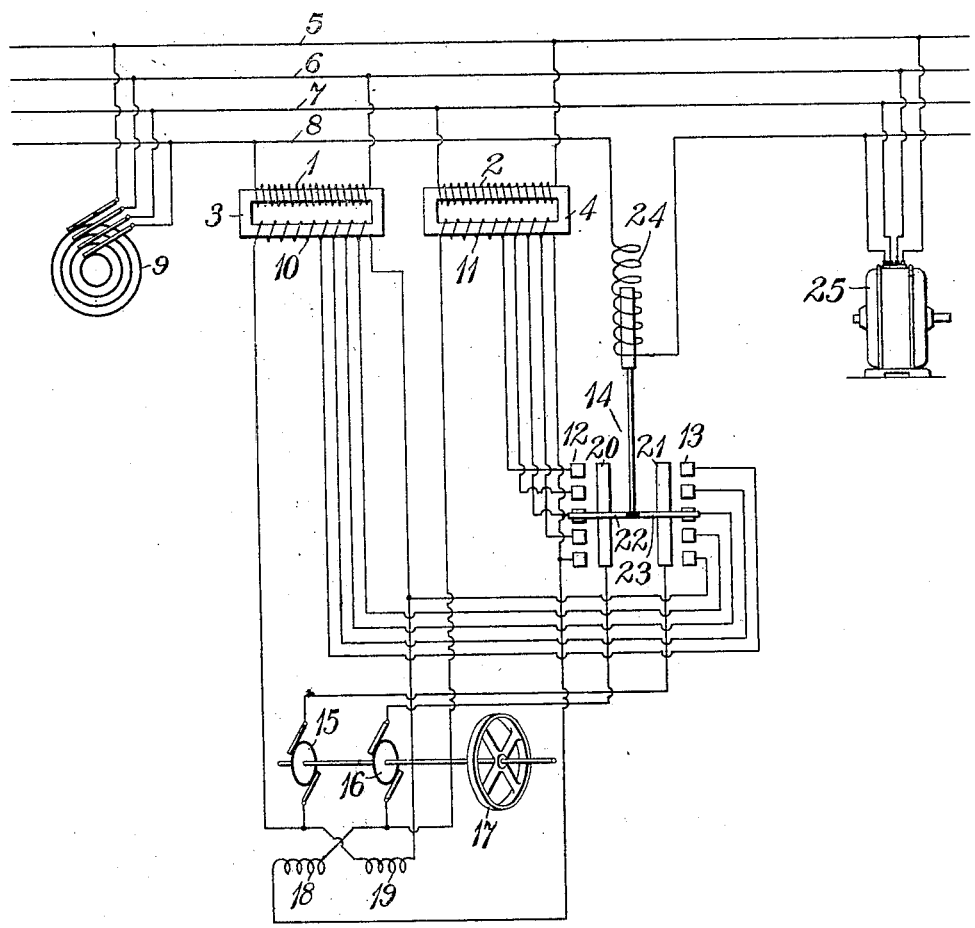
WITNESSES:
Fred H. Miller
Otto S. Schairer
INVENTOR
Benjamin G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL LOAD-EQUALIZING SYSTEM.

No. 925,356.     Specification of Letters Patent.     Patented June 15, 1909.

Original application filed September 3, 1907, Serial No. 391,214. Divided and this application filed November 6, 1908. Serial No. 461,301.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Electrical Load-Equalizing Systems, of which the following is a specification, this application being a division of my application, Serial No. 391,214, filed September 3, 1907.

My invention relates to systems of electrical distribution, and particularly to means for equalizing the load upon the generator or supply station when the load upon the system is variable.

The object of my invention is to provide simple and effective means that may be employed in connection with polyphase alternating current systems of distribution for absorbing or yielding energy in accordance with variations in load upon the system, in such a manner that the load upon the generating or supply station of the system may remain substantially constant or may not exceed a predetermined value.

It has heretofore been proposed to employ fly-wheels or other devices having considerable inertia in systems of distribution that supply translating devices requiring widely varying amounts of power, and to so drive the fly-wheels and control their operation that the load upon the distributing circuit will remain substantially constant, regardless of the variations in the amount of power required by the translating devices.

In the present system, a dynamo-electric machine that may operate either as a motor or as a generator and to which a fly-wheel is mechanically coupled, is directly associated with the distributing circuit, and the arrangement is such that but comparatively small and inexpensive machines need be provided and only a single equalizer set is necessary for equalizing the load provided by a plurality of translating devices.

In carrying the invention into effect, a plurality of mechanically coupled dynamo-electric machines of the commutator type, one for each phase of the system of distribution, are employed, a fly-wheel or other parts having considerable inertia being also coupled to the said machines. The armatures of the machines are associated, respectively, with the various phases of the distributing circuit, and the field magnet windings are associated with phases of the circuit other than those to which the corresponding armatures are connected, in order that the generated and counter electromotive forces of the armatures may be nearly of the same phases as the electromotive forces of the circuits to which they are connected. The machines are caused to operate alternately as motors and generators by adjusting the ratio of the electromotive forces respectively of the distributing circuit and of the armatures of the machines in accordance with variations in the load afforded by the translating devices, energy being stored in the fly-wheel when operating the machines as motors and yielded for operating the machines as generators to supply current to the system. The adjustment of the ratio of the said electromotive forces is effected in the present instance by varying the active lengths of transformer windings that are interposed in circuit between the armatures of the machines and the distributing circuit.

In the single figure of the accompanying drawing, primary windings 1 and 2 of two transformers 3 and 4 are connected, respectively, to the different phases of a two-phase distributing circuit 5—6—7—8 that may be supplied from a generator 9, or from any other suitable source, secondary windings 10 and 11 of the transformers being subdivided and the several points of subdivision thereof being connected, respectively, to two sets of stationary contact terminals 12 and 13 of a controller 14. Armatures 15 and 16 of two dynamo-electric machines of the commutator type of construction are connected, by means of the controller 14, to transformer windings 10 and 11, respectively, while the field magnet windings 18 and 19 of the dynamo-electric machines are connected to transformer windings 11 and 10, respectively. It will thus be seen that the electromotive forces applied to the field magnet windings are substantially 90° out of phase with the electromotive forces of the circuits to which the armatures are connected, and the generated and counter electromotive forces of the armatures will, therefore, agree approximately in phase with the electromotive forces of the circuits to which they are connected. Armatures 15 and 16 are mechanically coupled together, and are either provided with large masses or are coupled to a fly-wheel 17 whereby the rotatable system is provided with considerable inertia. The controlling device 14 comprises, further, two stationary contact strips 20 and 21 disposed respectively adjacent to the sets of contact terminals 12 and 13, and two movable conducting segments 22 and 23 that engage the contact terminals and strips and are actuated by an electro-magnet having an operating magnet winding 24 to which current is supplied proportional in amount to that required of the distributing circuit by a suitable load, such, for example, as an induction motor 25. The controller 14 thus serves to adjust the points of connection of the armatures 15 and 16 with the transformer windings 10 and 11 in accordance with variations in the amount of current traversing the distributing circuit, and it thereby also adjusts the ratio of the electromotive forces respectively of the distributing circuit and of the armatures of the dynamo-electric machines.

If, in the operation of the system, the current required of the distributing circuit by the load 25 is less than a predetermined amount, the movable conducting segments 22 and 23 of the controller 14 will occupy such positions that the armatures of the dynamo-electric machines will be connected between high-voltage points of the transformer windings 10 and 11, and the machines will be caused to operate as motors, thus storing energy in the fly-wheel 17 and in the remainder of the rotatable system. If the load increases, the movable conducting segments 22 and 23 of the controller will be raised so as to connect the armatures 15 and 16 to lower voltage points of the transformers 10 and 11, and the machines may then be caused to operate as generators, utilizing the energy previously stored in the rotatable system as the actuating means therefor. The generated electromotive forces will be greater than the electromotive forces between the points of connection of the armatures to the transformer windings, and current will, therefore, be supplied by the dynamo-electric machines to the distributing circuit, thereby relieving the generator 9 of a portion of the increased load afforded by the device 25.

I claim as my invention:

1. The combination with a polyphase alternating current distributing circuit, and a plurality of mechanically coupled dynamo-electric machines having their armatures associated, respectively, with differently phased electromotive forces thereof, of means for applying to the field magnet windings of the machine electromotive forces that differ in phase, respectively, from those of the said circuit with which the corresponding armatures are associated, and means for adjusting the value of the electromotive forces with which the said armatures are associated in accordance with variations in the amount of current required of the distributing circuit.

2. The combination with a polyphase alternating current distributing circuit and a plurality of mechanically coupled dynamo-electric machines having their armatures associated, respectively, with differently phased electromotive forces thereof, of transformers interposed in circuit between the armatures of the machines and the distributing circuit, means for applying to the field magnet windings of the machines electromotive forces that differ in phase, respectively, from those of the said circuit with which the corresponding armatures are associated, and means for adjusting the ratios of transformation of the transformers in accordance with variations in the amount of current required of the distributing circuit.

3. The combination with an alternating current distributing circuit, a transformer connected thereto and a dynamo-electric machine connected to the transformer, of means for applying to the field magnet winding of the machine an electromotive force different in phase from that of said circuit, and means for adjusting the ratio of transformation of the said transformer in accordance with variations in the amount of current required of the distributing circuit.

4. The combination with an alternating current distributing circuit, a transformer connected thereto and a dynamo-electric machine connected to the transformer, of means for applying to the field magnet winding of the machine an electromotive force different in phase from that of said circuit, and means for adjusting the ratio of transformation of the said transformer to cause the machine to operate as a motor when the current required of the distributing circuit is less than a predetermined amount and to operate as a generator when the said current exceeds the predetermined amount.

In testimony whereof, I have hereunto subscribed my name this 19th day of Oct. 1908.

BENJ. G. LAMME.

Witnesses:
E. LIVINGSTONE,
BIRNEY HINES.